United States Patent
Lautenschlaeger

(10) Patent No.: US 8,615,011 B2
(45) Date of Patent: Dec. 24, 2013

(54) METHOD OF ROUTING A PACKET

(75) Inventor: Wolfram Lautenschlaeger, Stuttgart (DE)

(73) Assignee: Alcatel Lucent, Paris (FR)

( * ) Notice: Subject to any disclaimer, the term of this patent is extended or adjusted under 35 U.S.C. 154(b) by 216 days.

(21) Appl. No.: 13/321,035

(22) PCT Filed: May 19, 2010

(86) PCT No.: PCT/EP2010/056892
§ 371 (c)(1),
(2), (4) Date: Nov. 17, 2011

(87) PCT Pub. No.: WO2010/142521
PCT Pub. Date: Dec. 16, 2010

(65) Prior Publication Data
US 2012/0063461 A1  Mar. 15, 2012

(30) Foreign Application Priority Data
Jun. 10, 2009 (EP) .................................. 09290426

(51) Int. Cl.
*H04L 12/26* (2006.01)

(52) U.S. Cl.
USPC .......................................... 370/392; 370/401

(58) Field of Classification Search
USPC .............................. 370/392, 400, 401, 395.31
See application file for complete search history.

(56) References Cited

U.S. PATENT DOCUMENTS

2003/0021227 A1  1/2003  Lee et al.

FOREIGN PATENT DOCUMENTS

| EP | 1037433 A1 | 9/2000 |
| WO | WO-02091208 A2 | 11/2002 |

OTHER PUBLICATIONS

International Search Report for International Application No. PCT/EP2010/056892 filed May 19, 2010.

*Primary Examiner* — Brian D Nguyen
(74) *Attorney, Agent, or Firm* — Harness, Dickey & Pierce

(57) ABSTRACT

The invention concerns a method of routing a packet in a packet switching network, and a corresponding router (50). A new or an obsolete entry in a routing table is detected. A timer is started. A packet filter is configured having a pass probability which is an increasing or decreasing function of the timer whereby said function is increasing if the detected entry is a new entry and decreasing if the detected entry is an obsolete entry. An incoming packet which matches the detected entry is detected. The detected packet is filtered with the packet filter. If the detected packet passes the packet filter, the detected packet is routed in accordance with the detected entry. If the detected packet does not pass the packet filter, the detected packet is routed in accordance with another entry of the routing table.

11 Claims, 5 Drawing Sheets

METHOD OF ROUTING A PACKET

The present invention relates to a method of routing a packet in a packet switching network, and a router to execute said method.

A routing change of packet traffic which is aggregated from many independent and comparably small sources can lead to problems. A routing change at a router is able to redirect simultaneously a large amount of the aggregated traffic from one router interface to another one. For a network behind the router interface, this acts statistically as if there would be acting a single large on/off source. In consequence statistically managed QoS is limited to static routing tables (QoS=Quality of Service). Further, routing changes are followed by a period of time with best effort performance until new traffic statistics are acquired and found to fit to the actual capacities.

It is an object of the present invention to provide an improved routing of packets.

A first object of the present invention is achieved by a method of routing a packet in a packet switching network, the method comprising the steps of detecting a new or an obsolete entry in a routing table; starting a timer; configuring a packet filter having a pass probability which is an increasing or decreasing function of the timer whereby said function is increasing if the detected entry is a new entry and decreasing if the detected entry is an obsolete entry; detecting an incoming packet which matches the detected entry; filtering the detected packet with the packet filter; if the detected packet passes the packet filter, routing the detected packet in accordance with the detected entry; and otherwise, if the detected packet does not pass the packet filter, routing the detected packet in accordance with another entry of the routing table. A second object of the present invention is achieved by router in a packet switching network, the router comprising an interface adapted to receive an incoming packet from the packet switching network, a routing table adapted to store routing-related entries, a routing unit adapted to route the incoming packet, and a control unit adapted to detect a new or an obsolete entry in the routing table, start a timer, configure a packet filter having a pass probability which is an increasing or decreasing function of the timer whereby said function is increasing if the detected entry is a new entry and decreasing if the detected entry is an obsolete entry, detect an incoming packet which matches the detected entry, filter the detected packet with the packet filter, trigger the routing unit to route, if the detected packet passes the packet filter, the detected packet in accordance with the detected entry, and otherwise, if the detected packet does not pass the packet filter, trigger the routing unit to route the detected packet in accordance with another entry of the routing table.

The term "another entry of the routing table" refers to an entry of the routing table which provides a routing instruction for an alternative routing different from the routing associated with the new or obsolete entry. In case of a new entry, the other entry of the routing table preferably refers to one or more entries which provide one or more routing instructions according to which the packet would be routed if the new entry did not exist. In case of an obsolete entry, the other entry of the routing table preferably refers to one or more entries which provide one or more routing instructions according to which the packet would be routed if the obsolete entry did not exist.

The invention provides a hitless routing change from a first routing situation to a second routing situation. The invention allows to suppress misleading statistical effects of routing changes. Further, the invention also suppresses the unpredictable danger of overload in downstream networks which can result from a routing change. The invention enables gradual routing changes in a network.

The invention has the advantage that a sudden (=hit-like), big change of load ratios between different outgoing links of a router is avoided (=hitless). Subsequent, i.e. downstream, networks receive a chance to get accustomed to a slowly growing/declining traffic volume.

Further advantages are achieved by embodiments of the invention indicated by the dependent claims.

According to an embodiment of the invention, a kind of load balancing is applied to a new routing entry with an initial load share of zero and a time controlled ramp-up to 100%. In analogy, a kind of load balancing is applied to an obsolete routing entry with an initial load share of 100% declining to zero.

According to an embodiment of the invention the step of starting a timer comprises triggering the timer to count a time value t from an initial time value $t=t\_ini$ to a final time value $t=t\_fin$ whereby a ramp length defined as $T=t\_fin-t\_ini$ is greater than 0 and whereby the said increasing or decreasing function is dependent on the time value t. A function is said to be increasing or decreasing if the function values are increasing or decreasing, respectively, within increasing function arguments. In the present case, time-dependent functions are considered, i.e. the arguments of the functions are time values.

According to an embodiment of the invention the ramp length T is chosen longer than a typical time scale of an application stream within the network. The typical time scale of the application stream does not refer to a specific application with which the detected packet is associated but to a typical (or dominant) traffic in the network. For example, if a typical (or dominant) application of the application traffic stream passing the router is a web browser, the typical time scale of the application stream may refer to a time scale on the order of several hundred microseconds; accordingly, a typical ramp length T could be T=30 seconds. For example, if a typical (or dominant) application of the application traffic stream passing the router is for displaying a video on a computer, the typical time scale of the application stream may refer to a time scale on the order of several minutes; accordingly, a typical ramp length T could be T=30 minutes. Unlike routing approaches which rely on information about a specific nature of an incoming packet, e.g. by use of DPI (=Deep Packet Inspection), the present invention does not utilise information about the specific nature of the single incoming packet to be routed. Therefore, the present invention saves resources.

According to an embodiment of the invention the step of filtering the detected packet with the packet filter comprises the steps of: associating the detected packet with a random number x; comparing the associated random number x with a time dependent threshold value y, which is proportional to the said pass probability of the packet filter; if the computed random number x is smaller than or equal to the threshold value y, considering that the detected packet is considered as passing the packet filter; and otherwise, if the computed random number x is greater than the threshold value y, the detected packet is considered as not passing the packet filter. Preferably, the step of comparing the associated random number x with the time dependent threshold value y of the random number x is a singular event which is to be performed as fast as possible, without a setting of time standards.

According to an embodiment of the invention the associated random number x is a hash value computed from data contained with a packet header of the detected packet. If is possible that the hash value x is derived from the selected information in the header of the incoming packet. The information pertains to a source address field, a source port field, a destination address field, a destination port field, and a protocol ID field, e.g. MPLS label (ID=identification/identifier; MPLS=Multi-Protocol Label Switching). The selected information can be an entire field, a segment of a field, or a number of segments of a field. Any of a variety of hashing functions can be employed, for example the simple hashing function x=K modulo M, where K is a number related to the selected packet header data and M is a predetermined value. Packets are routed in one or the other direction depending on the hash value. The use of a hash value instead of simply choosing random numbers is preferable because related packets of a particular application stream evaluate into identical hash values, which results in uniform routing decisions for all packets of the particular application stream. This avoids out-of-order arrival problems of packets traversing different paths.

According to an embodiment of the invention the associated random number x is an equally distributed hash value. With a proper designed hash function, the hash value representing the associated random number x is equally distributed in the range of possible hash values, so that any load share can be adjusted by choosing a proper threshold.

According to an embodiment of the invention, the threshold value function y, if the detected entry is a new entry, is determined from a monotonically increasing function y(t) with y(t_ini)=x_min and y(t_fin)=x_max. The value x_min is the minimum of the range of possible hash values and the value x_max is the maximum of the range of possible hash values. If the detected entry is an obsolete entry, the threshold value y is determined from a monotonically decreasing function y(t) with y(t_ini)=x_max and y(t_fin)=x_min. Further the step of filtering the detected packet with a packet filter further comprises: Associating the detected packet with an effective time t_eff wherein t_ini≤t_eff≤t_fin. The hash value x associated with the detected packet is compared with the threshold value y(t_eff) at the time value t=t_eff. If the associated hash value x is smaller than or equal to the threshold value y(t_eff), the detected packet is considered as passing packet filter. Otherwise, if the computed hash value x is greater than the threshold value y(t_eff), the detected packet is considered as not passing the packet filter. Preferably, the threshold value function y is a steady function.

According to an embodiment of the invention, if the detected entry is a new entry and the pass probability has reached its maximum, the other entry is deleted from the routing table and the packet filter is put out of action. In the alternative case, if the detected entry is an obsolete entry and the pass probability has reached its minimum, the obsolete entry is deleted from the routing table and the packet filter is put out of action. A routing table holds routing-related information about how to route a packet which is addressed to a certain destination. Preferably, the routing table is kept as a look-up table in a memory of the router.

When a routing change is executed, an overload situation may occur on a routing path which must handle more packet traffic than before the routing change. In a first case, due to a gradual routing change from the other entry to the new entry, an overload situation may occur on a routing path on which the detected packet is routed in accordance with the new entry. In a second case, due to a gradual routing change from the obsolete entry to the other entry, an overload situation may occur on a routing path on which the detected packet is routed in accordance with the other entry. According to an embodiment of the invention, if detecting an overload on a routing path on which the detected packet is routed either in accordance with the detected entry if the detected entry is a new entry or in accordance with the other entry if the detected entry is an obsolete entry, the pass probability of the packet filter is at least partially returned and/or temporarily kept constant. It is possible that the function which defines the pass probability is gradually, preferably steadily and monotonically, returned to one of its prior values when an overload is detected. It is possible that the current value of the function which defines the pass probability is kept constant for a certain time $\Delta t$ and then the function is allowed to increase or decrease again starting from this constant value. It is also possible that a combination of these two aforementioned possibilities is performed. Preferably, the time period $\Delta t$ and the prior value are determined dependent on the severity of the overload situation. Thus, the invention provides a possibility to pause or even at least partially take back routing changes that turn out to be overloading, altogether without intermediate interruption of service quality. Therefore, the invention suppresses the unpredictable danger of overload in downstream networks which can result from a routing change.

Preferably, if an overload has been detected on a routing path on which the detected packet is routed either in accordance with the detected entry if the detected entry is a new entry or in accordance with the other entry if the detected entry is an obsolete entry, the control unit computes a modified threshold value $y_{mod}(t\_eff)$ as a function value of a modified function $y_{mod}(t)$ at t=t_eff. The modified function $y_{mod}(t)$ is based on the original, unmodified function y(t) and is adapted to at least partially return the pass probability of the packet filter and/or temporarily keep the pass probability of the packet filter constant in order to provide the packet switching network with time to solve the overload situation and/or to unload the packet switching network which is affected by the overload situation.

According to an embodiment of the invention the router further comprises a mapping element which is adapted to associate the detected packet with a hash value x. Preferably, the mapping element also is adapted to compute the hash value x from data contained within a packet header of the detected packet.

These as well as further features and advantages of the invention will be better appreciated by reading the following detailed description of exemplary embodiments taken in conjunction with accompanying drawings of which:

Figure 1:
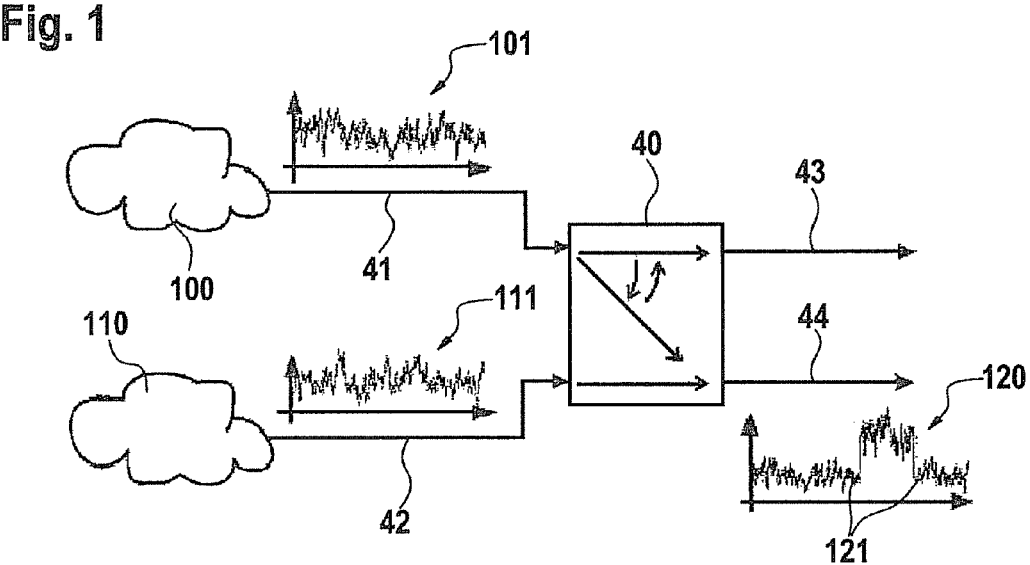
FIG. 1 is a diagram of a routing change according to prior art.

FIG. 1 is a diagram of a routing change according to prior art. FIG. 1 shows a state-of-the-art router 40 with incoming links 41, 42 and outgoing links 43, 44 in a packet switching network. On the first input link 41, packet traffic 101 aggregated from a first set of many small sources 100 arrives at the router 40. On the second input link 42, packet traffic 111 aggregated from a second set of many small sources 110 arrives at the router 40. The packet traffics 101, 102 are shown as curve sketches with the packet rate given along the y-axis and time given along the x-axis.

An abrupt routing change in the router 40 causes a sudden change in the distribution which determines how the outgoing packets are shared among the outgoing links 43, 44. The packet rate diagram 120 showing the packet traffic on the outgoing link 44 exhibits a sudden increase 121 and some time later a sudden decrease 121 of the packet rate. That means that the abrupt routing change results in a packet rate change which is similar to a packet rate change caused by a big on/off source. The downstream network is equally effected in both cases.

That means that a routing change can redirect simultaneously a large amount of aggregated traffic from one interface 43 to another one 44. For the network behind the interface 44 this acts statistically as if there would be acting a single large on/off source. Downstream gateway functions cannot distinguish whether the routing change is associated with a large number of small sources or a really large on/off source. Moreover the load hit 121 caused by a routing change affects a downstream network equally heavy as it would do a large on/off source.

Figure 2:
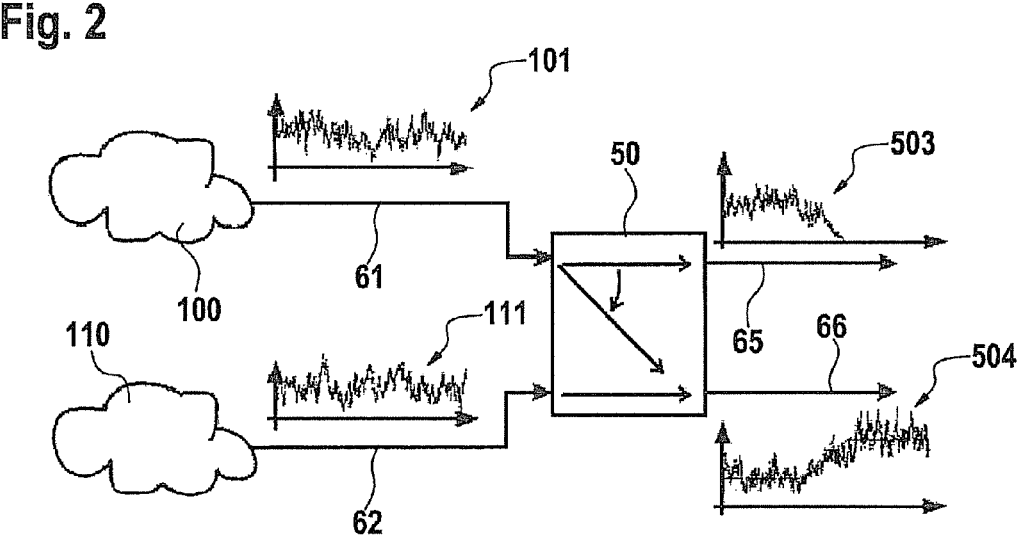
FIG. 2 is a diagram of a routing change according to an embodiment of the invention.

FIG. 2 is a diagram of a routing change according to an embodiment of the present invention. FIG. 2 shows a router 50 with incoming links 61, 62 and outgoing links 65, 66 in a packet switching network. On the first input link 61, packet traffic 101 aggregated from the first set of many small sources 100 arrives at the router 50. On the second input link 62, packet traffic 111 aggregated from the second set of many small sources 110 arrives at the router 50. The packet traffics 101, 102 are shown as curve sketches with the packet rate given along the y-axis and time given along the x-axis.

It is assumed that a routing change takes place from an obsolete outgoing link 65 to a new outgoing link 66. A routing change may have various reasons, e.g. an operator may want to keep a link clear for maintenance work, or an automatic up-date algorithm may write a new entry into the routing table or mark an entry of the routing table as obsolete resulting in a different route. In case of a routing change according to an embodiment of the invention, the traffic share on the obsolete routing link 65 phases out whereas the traffic share on the new routing link 66 ramps up. The routing change according to an embodiment is performed hitless, i.e. without an abrupt change in the packet rate. The hitless routing change preserves the statistical features of the underlying packet traffic. A downstream network can react on time to the (slowly) changing conditions, or, in emergency, signal to pause the ongoing change.

Figure 3A:
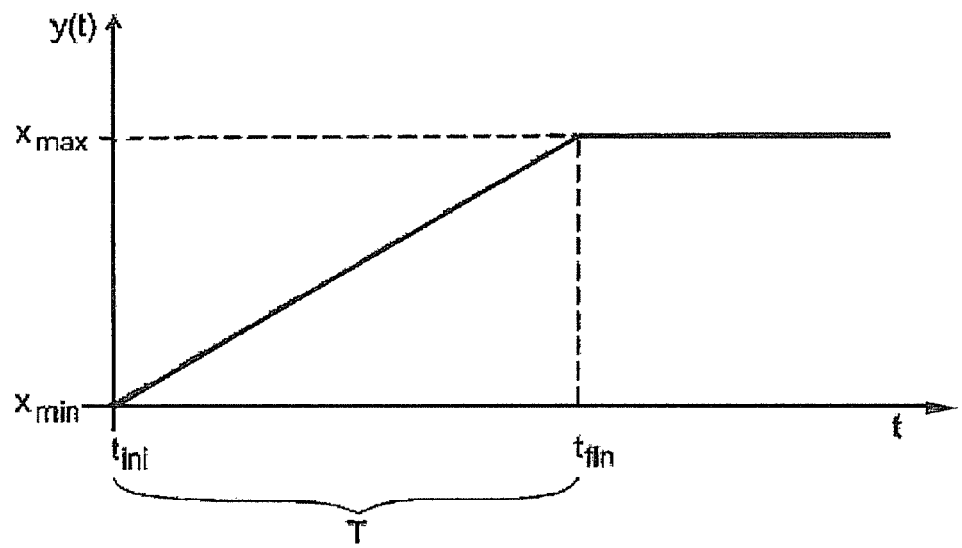
FIG. 3a is a diagram of a monotonically increasing function y(t) according to an embodiment of the invention.

FIG. 3*a* shows a curve sketching with a threshold value function y(t) over time t. The function y(t) is a time-dependent threshold value function that ramps up from a minimum value x_min to a maximum value x_max during a ramp length T which is defined as T=t_fin−t_ini. At t_ini, the threshold value y(t_ini) has the value of x_min, at t_fin the threshold value y(t_fin) has the value of x_max. This threshold value function y(t) is an increasing function that is used for a new entry in the routing table.

Figure 3B:
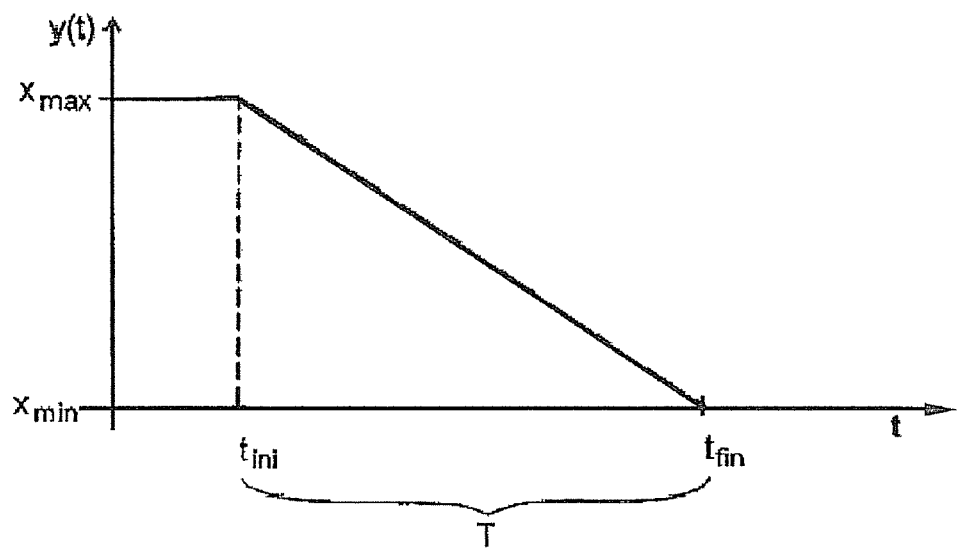
FIG. 3b is a diagram of a monotonically decreasing function y(t) according to an embodiment of the invention.

FIG. 3*b* shows, in an analogous illustration as in FIG. 3*a*, a curve sketching with a decreasing threshold value function y(t) over time t. At t_ini the threshold value y(t_ini) has the value of x_max and at t_fin the threshold value y(t_fin) has the value x_min. This threshold value function y(t) is used for an obsolete entry in the routing table.

Figure 4:
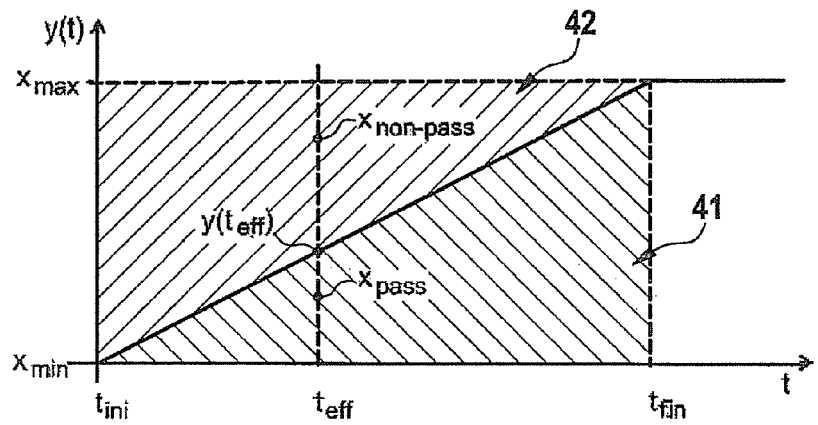
FIG. 4 is a diagram illustrating a packet filtering decision according to an embodiment of the invention.

FIG. 4 shows a curve sketching with an increasing threshold value function y(t) over time t. The threshold value function y(t) ramps up from a minimum value x_min at t=t_ini to a maximum value x_max at t=t_fin. When an incoming packet arrives at the interface of a router, it is associated with a time value t_eff which characterises the arrival time of the packet. At this time value t_eff, the threshold value y(t_eff) is determined. Moreover, for the incoming packet a hash value x is determined and associated with the incoming packet. The associated hash value x can have any value in the range of possible hash values from x_min to x_max. With regard to the threshold value y(t_eff), the associated hash value x can either be greater than the threshold value y(t_eff), i.e. be in the area 42 indicated by the dashed lines, or be equal to/smaller than the threshold value y(t_eff), i.e. be in the area 41 indicated by the continuous lines. Dependent on in which area 41, 42 the hash value x of the incoming packet is located, the incoming packet is considered to pass the packet filter (in case the hash value x is located in area 41) or not to pass the packet filter (in case the hash value x is located in the area 42).

Figure 5:
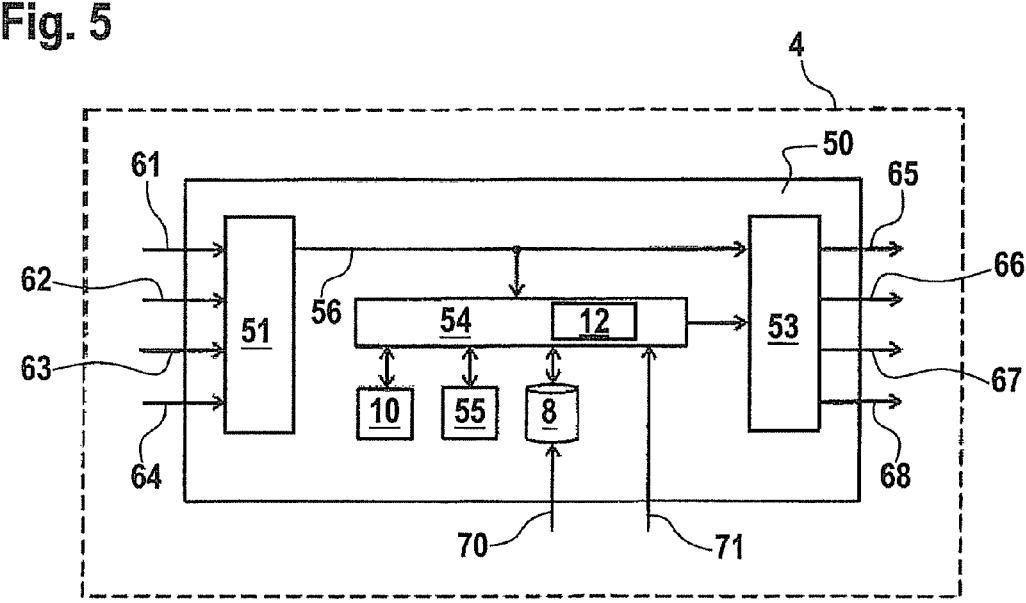
FIG. 5 is a block diagram of a router according to an embodiment of the invention.

FIG. 5 shows a packet switching network 4 wherein a router 50 according to an embodiment of the present invention is located. The router 50 comprises an interface with incoming links 61 to 64 and an interface with outgoing links 65 to 68. Each input link 61 to 64 can be handled separately with respect to where packets that arrive on the input link 61 to 64 are routed, or the packets of the input links 61 to 64 can be effectively multiplexed and handled as a single stream of packets that are to be routed to the output links 65 to 68. For purposes of this disclosure, while it matters not how the systems is actually embedded, the principles disclosed herein are simpler to understand when the input is handled as a single stream and, therefore, the following assumes that the input links 61 to 64 are applied to a multiplexer contained within the input interface 51, yielding a single stream of incoming packets on line 56. Line 56 is coupled to a control unit 54 which comprises a packet filter 12. The control unit 54 is connected to a timer 10, a mapping unit 55 and a routing table 8.

The control unit 54 is composed of one or several interlinked computers, i.e. a hardware platform, a software platform basing on the hardware platform, and several application programs executed by the system platform formed by the software and hardware platform. The functionality of the control unit 54 is provided by the execution of these application programs. The application programs or a selected part of these application programs constitute a computer software product providing a routing control service as described in the following, when executed on the system platform. Further, such computer software product is constituted by a storage medium storing these application programs or said selected part of application programs.

If the control unit 54 detects a new or an obsolete entry in the routing table 8 it starts the timer 10 and configures the packet filter 12 having a pass probability which is an increasing or decreasing function of the timer 10 whereby the function is increasing if the detected entry is a new entry and decreasing if the detected entry is an obsolete entry. An incoming packet arriving at the input interface 51 is unpacked and put onto the line 56. The control unit 54 reads data of the packet header, e.g. a destination address, and compares these data with entries of the routing table 8. If the control unit 54 detects an incoming packet on the line 56 which matches the detected entry in the routing table 8, the control unit 54 queries the timer 10 to provide a time value t_eff corresponding to the arrival time of the detected packet at the router 50 relative to the detection time of the new or obsolete routing table entry and associates this time value t_eff to the detected packet. The control unit 54 triggers the mapping unit 55 to compute a hash value x from data contained in a packet header of the detected packet and associate the computed hash value x with the detected packet. Accordingly, the mapping unit 55 extracts data from the packet header and computes a hash value x from these extracted data. The mapping unit 55 associates the computed hash value with the detected packet. The control unit 54, in particular the packet filter 12, compares the computed hash value x received from the mapping unit 55 with a function value y(t_eff) of a time dependent threshold value function y(t), determined for the time value t_eff. The threshold values y(t) increase with increasing time values t if the detected entry is a new entry and decrease with increasing time values t if the new entry is an obsolete entry.

The routing table 8 and the control unit 54 are responsive to control signals arriving on control lines 70, 71. By means of the control lines 70, 71, e.g. an operator of the router has access to the routing table 8 and the control unit 54. It is possible that the operator implements a new entry in the routing table 8. Accordingly, the control unit 54 detects the new entry, e.g. manually triggered by the operator or by means of a continuously running detection routine which searches for a change in the content of the routing table 8. By means of the control line 71, the operator can access the control unit 54, e.g. to load a set of threshold functions y(t), an increasing and a decreasing one, into a memory module of the control unit 54.

Figure 6A:
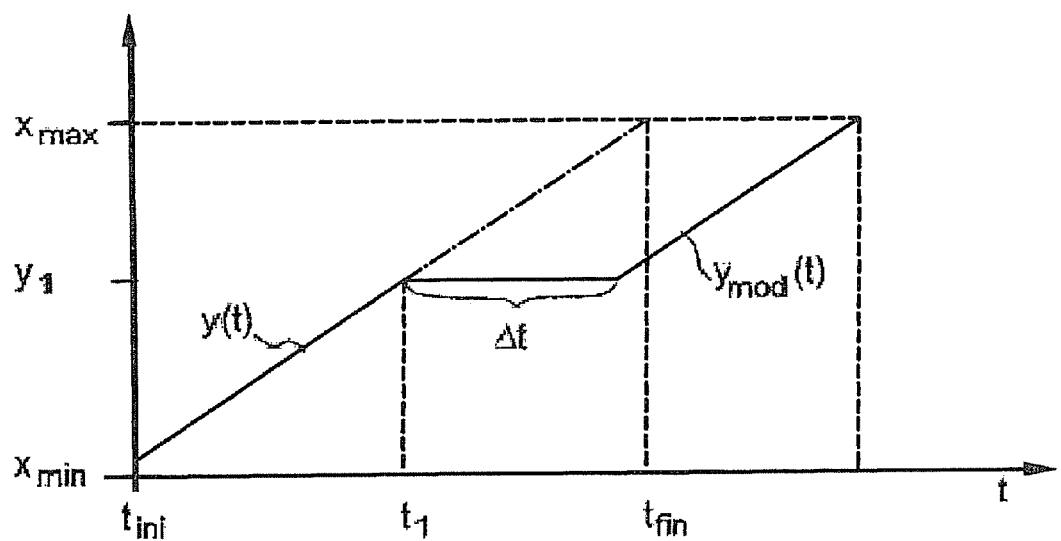
FIGS. 6a-6c are diagrams of a threshold value function y(t) which is modified to a modified threshold value function $y_{mod}(t)$ after detection of an overload situation.
Figure 6B:
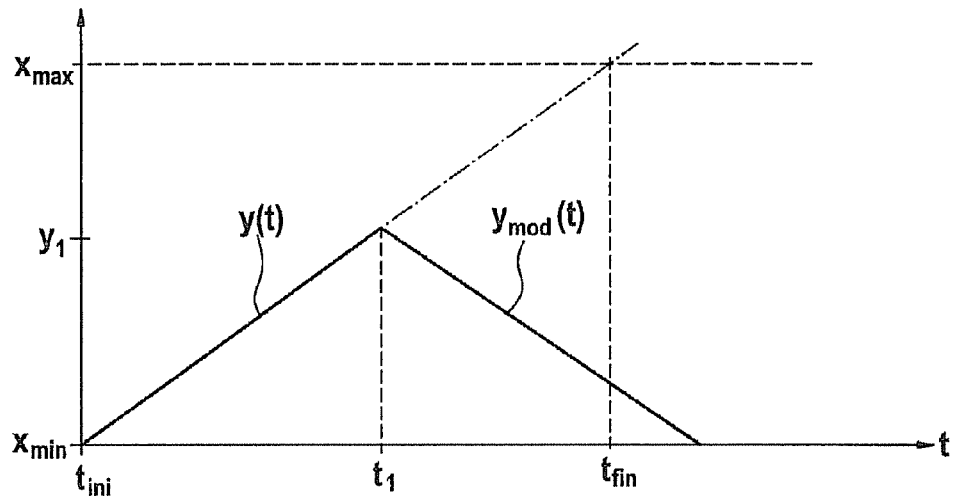
Figure 6C:
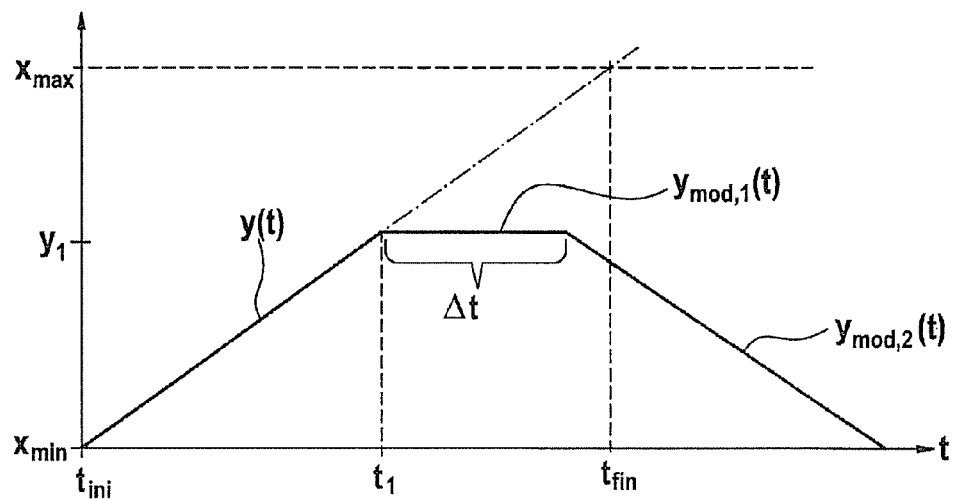

FIGS. 6a to 6c show three exemplary curve sketches with an increasing threshold value function y(t) and a modified threshold value function $y_{mod}(t)$ over time t. In FIGS. 6a to 6c, an increasing threshold value function y(t) is shown which corresponds to the case that the detected entry is a new entry. It is to be noted that the case that the detected entry is an obsolete entry can be handled correspondingly. FIGS. 6a to 6c show a time-dependent threshold value function y(t) corresponding to the function y(t) described in FIG. 3a. At a time t1 and a corresponding threshold value y1:=y(t1), an operator reports to the control unit 54, via the control line 71, an overload situation on the routing path on which the detected packet is routed in accordance with the new entry. It is also possible that a downstream network signals, preferably via control line 71, an overload or an impending overload. Triggered by the report and/or the signal, the control unit 54 modifies the threshold value function y(t) and generates a modified threshold value function $y_{mod}(t)$ valid for the time after t1, i.e. after the report of the overload situation. The control unit 54, in particular the packet filter 12, computes the modified threshold value function $y_{mod}(t)$ based on the original, unmodified threshold value function y(t) and performs, at a time t>t1, the filtering of the incoming packets on the basis of the modified threshold value function $y_{mod}(t)$. The modified threshold value function $y_{mod}(t)$ is adapted to at least partially return the pass probability of the packet filter and/or temporarily keep the pass probability of the packet filter constant.

FIG. 6a shows an example of a mode "pause" where the pass probability of the packet filter 12 is temporarily kept constant. The original, unmodified increasing threshold value function y(t) is shown for time t≤t1 as a solid line indicating that it is the valid threshold value function for this time range. The original, unmodified increasing threshold value function y(t) is shown for time t>t1 as a dot-dashed line indicating that it is not the valid threshold value function for this time range. At a time t1, a downstream network signals an imminent overload with a possibility of its own to counteract the overload. Triggered by this overload signal, the control unit 54 computes a modified threshold value function $y_{mod}(t)$ which affords the downstream network a time period Δt to counteract the imminent overload. After the time period Δt has passed, the paused routing change is resumed. The modified threshold value function $y_{mod}(t)$ is defined from the original threshold value function y(t) as follows: $y_{mod}(t)=y1=y(t=t1)$ for t1<t<t1+Δt, and $y_{mod}(t)=y(t-\Delta t)$ for t≥t1+Δt. The modified threshold value function $y_{mod}(t)$ which is valid for t>t1 (indicated by the solid line at t>t1) is kept constantly at the value y1 for a time period ]t1; t1+Δt[ and after passing of this time period is allowed to increase again at a time-dependent increase rate equal to the increase rate of the original threshold value function y(t).

FIG. 6b shows an example of a mode "take back" where the pass probability of the packet filter 12 is returned from a current value y1 to a prior value. The drawing of FIG. 6b such as solid lines and dot-dashed lines corresponds to the drawing of FIG. 6a. The original, unmodified increasing threshold value function y(t) is shown for time t≤t1 as a solid line indicating that it is the valid threshold value function for this time range. The original, unmodified increasing threshold value function y(t) is shown for time t>t1 as a dot-dashed line indicating that it is not the valid threshold value function for this time range. At a time t1, a downstream network signals an imminent overload without a possibility of its own to counteract the overload. Triggered by this overload signal, the control unit 54 computes a modified threshold value function $y_{mod}(t)$ which takes back the routing change. The modified threshold value function $y_{mod}(t)$ which is valid for t>t1 (indicated by the solid line at t>t1) is defined from the original threshold value function y(t) as follows: $y_{mod}(t)=y(2 \cdot t1-t)$ for t>t1. The modified threshold value function $y_{mod}(t)$ returns from the current value y1 to the prior value x_min at a time-dependent decrease rate equal to the negative increase rate of the original threshold value function y(t).

FIG. 6c shows an example of a combination of the aforementioned modes "pause" and "take back". At a time t1, a downstream network signals an imminent overload with a possibility of its own to counteract the overload. Triggered by this overload signal, the control unit 54 computes a modified threshold value function $y_{mod,1}(t)$ which affords the downstream network a time period Δt to counteract the imminent overload. After the time period Δt has passed, the downstream network signals that the overload situation is still critical, e.g. because the resources of the downstream network are not sufficient. As a consequence, triggered by this second overload signal, the control unit 54 determines to take back the routing change and computes a modified threshold value function $y_{mod,2}(t)$ which returns from the current value y1 to the prior value x_min at a time-dependent decrease rate equal to the negative increase rate of the original threshold value function y(t).

The invention claimed is:

1. A method of routing a packet in a packet switching network, the method comprising: detecting a new or an obsolete entry in a routing table; and starting a timer; wherein the method further comprises: configuring a packet filter having a pass probability which is an increasing or decreasing function of the timer whereby said function is increasing if the detected entry is a new entry and decreasing if the detected entry is an obsolete entry; detecting an incoming packet which matches the detected entry; filtering the detected packet with the packet filter; if the detected packet passes the packet filter, routing the detected packet in accordance with the detected entry; and otherwise, if the detected packet does not pass the packet filter, routing the detected packet in accordance with another entry of the routing table.

2. The method of claim 1, wherein that the step of starting a timer comprises: triggering the timer to count a time value t from an initial time value t=t_ini to a final time value t=t_fin whereby a ramp length T defined as $T=t\_fin-t\_ini$ is greater than 0 and whereby the said increasing or decreasing function is dependent on the time value t.

3. The method of claim 2, wherein that the ramp length T is chosen longer than a typical time scale of an application stream comprising the incoming packet.

4. The method of claim 1, wherein that the step of filtering the detected packet with the packet filter comprising:
associating the detected packet with a random number x;
comparing the associated random number x with a time-dependent threshold value y which is proportional to the said pass probability of the packet filter;
if the associated random number x is smaller than or equal to the threshold value y, considering the detected packet as passing the packet filter; and
otherwise, if the associated random number x is greater than the threshold value y, considering the detected packet as not passing the packet filter.

5. The method of claim 4, wherein that the associated random number x is a hash value computed from data contained within a packet header of the detected packet.

6. The method of claim 4, wherein that the associated random number x is equally distributed in the range of possible hash values.

7. The method of claim 4, wherein that the step of configuring the packet filter comprises:
if the detected entry is a new entry, determining the threshold value y from a monotonically increasing function y(t) with $y(t\_ini)=x\_min$ and $y(t\_fin)=x\_max$ whereby x_min is the minimum of the range of possible hash values x and x_max is the maximum of the range of possible hash values x; and
if the detected entry is an obsolete entry, determining the threshold value y from a monotonically decreasing function y(t) with $y(t\_ini)=x\_max$ and $y(t\_fin)=x\_min$; and
that the step of filtering the detected packet with the packet filter further comprises:
associating the detected packet with an effective time t_eff whereby $t\_ini<t\_eff<t\_fin$;
comparing the hash value x with the threshold value y(t_eff) at the time value $t=t\_eff$;
if the hash value x is smaller than or equal to the threshold value y(t_eff) at $t=t\_eff$, considering the detected packet as passing the packet filter; and
otherwise, if the hash value x is greater than the threshold value y(t_eff) at $t=t\_eff$, considering the detected packet as not passing the packet filter.

8. The method of claim 1, wherein that the method further comprises the steps of: if the detected entry is a new entry and the pass probability has reached its maximum, deleting the other entry from the routing table and putting the packet filter out of action; and if the detected entry is an obsolete entry and the pass probability has reached its minimum, deleting the obsolete entry from the routing table and putting the packet filter out of action.

9. The method of claim 1, wherein that the method further comprises the step of: if detecting an overload on a routing path on which the detected packet is routed either in accordance with the new entry or in accordance with the other entry if the detected entry is an obsolete entry, at least partially returning the pass probability of the packet filter and/or temporarily keeping the pass probability of the packet filter constant.

10. A router in a packet switching network, the router comprising an interface configured to receive an incoming packet from the packet switching network, a routing table configured to store routing-related entries, a routing unit configured to route the incoming packet, and a control unit configured to detect a new or an obsolete entry in the routing table, and start a timer, wherein the control unit is further configured to configure a packet filter having a pass probability which is an increasing or decreasing function of the timer whereby said function is increasing if the detected entry is a new entry and decreasing if the detected entry is an obsolete entry, detect an incoming packet which matches the detected entry, filter the detected packet with the packet filter, trigger the routing unit to route, if the detected packet passes the packet filter, the detected packet in accordance with the detected entry, and otherwise, if the detected packet does not pass the packet filter, trigger the routing unit to route the detected packet in accordance with another entry of the routing table.

11. The router of claim 10, wherein that the router further comprises a mapping element configured to associate the detected packet with a hash value x.

* * * * *